United States Patent

Choi

Patent Number: 5,828,834
Date of Patent: Oct. 27, 1998

[54] APPARATUS AND METHOD FOR SETTING AN ID CODE USING A MICROCOMPUTER IN A DISPLAY DEVICE

[75] Inventor: Chun-geun Choi, Suwon, Rep. of Korea

[73] Assignee: Samsung Electronics Co., Ltd., Rep. of Korea

[21] Appl. No.: 581,962

[22] Filed: Jan. 2, 1996

[30] Foreign Application Priority Data

Dec. 30, 1994 [KR] Rep. of Korea ............... 94 38285
Dec. 18, 1995 [KR] Rep. of Korea ............... 95 51338

[51] Int. Cl.$^6$ ............... C06F 11/00; H04K 1/00
[52] U.S. Cl. ............... 395/188.01; 348/5.5
[58] Field of Search ............... 348/5.5, 584; 395/188.01, 395/186, 187.01; 364/927.2, 709.01, 709.05, 709.06, 709.12; 380/3, 4, 23, 25

[56] References Cited

U.S. PATENT DOCUMENTS

| | | | |
|---|---|---|---|
| 4,718,107 | 1/1988 | Hayes | 455/4.1 |
| 4,721,954 | 1/1988 | Mauch | 340/825.31 |
| 4,930,160 | 5/1990 | Vogel | 380/23 |
| 4,958,297 | 9/1990 | Hansen | 364/518 |
| 5,033,085 | 7/1991 | Rew | 380/20 |
| 5,053,884 | 10/1991 | Kamijyo | 348/5.5 |
| 5,060,079 | 10/1991 | Rufus-Isaacs | 348/5.5 |
| 5,089,811 | 2/1992 | Leach | 345/199 |
| 5,173,940 | 12/1992 | Lantz et al. | 380/25 |
| 5,222,231 | 6/1993 | Gunji | 395/188.01 |
| 5,351,088 | 9/1994 | Nio et al. | 348/441 |
| 5,355,414 | 10/1994 | Hale et al. | 380/25 |
| 5,382,983 | 1/1995 | Kwoh et al. | 348/5.5 |
| 5,389,952 | 2/1995 | Kikinis | 345/212 |
| 5,402,492 | 3/1995 | Goodman et al. | 380/25 |
| 5,465,133 | 11/1995 | Gilboy | 348/5.5 |
| 5,469,029 | 11/1995 | Jackson et al. | 315/408 |
| 5,474,762 | 12/1995 | Morisawa et al. | 380/25 |
| 5,475,839 | 12/1995 | Watson et al. | 395/650 |
| 5,485,518 | 1/1996 | Hunter et al. | 348/5.5 |
| 5,485,622 | 1/1996 | Yamaki | 395/186 |
| 5,488,384 | 1/1996 | Uehara et al. | 345/1 |
| 5,537,544 | 7/1996 | Morisawa et al. | 395/188.01 |
| 5,541,666 | 7/1996 | Zeidler et al. | 348/589 |
| 5,550,575 | 8/1996 | West et al. | 348/5.5 |
| 5,579,028 | 11/1996 | Takeya | 345/115 |
| 5,585,858 | 12/1996 | Harper et al. | 348/485 |
| 5,606,614 | 2/1997 | Brady et al. | 380/23 |

*Primary Examiner*—Joseph Palys
*Attorney, Agent, or Firm*—Banner & Witcoff, Ltd.

[57] ABSTRACT

An apparatus in a display system for setting an ID password includes a microprocessor, an input device and an output device. The input device incorporates an array of user manipulated keys so as to allow a user to input an ID code to the microprocessor. The microprocessor includes a program for comparing an inputted ID code with preset ID data stored in a memory to determine consistency therebetween. The microprocessor further includes a program for displaying information visually to a user and so as to allow only an authorized user to use the display thereby protecting private confidential information from misuse. A method for implementing the ID password system includes generally the steps of inputting an ID code via an input device, comparing an inputted ID code with a preset data stored in a memory and thereby controlling the display. As a result, a display employing an embodiment of the present invention may be used by an authorized user only.

22 Claims, 6 Drawing Sheets

APPARATUS AND METHOD FOR SETTING AN ID CODE USING A MICROCOMPUTER IN A DISPLAY DEVICE

BACKGROUND OF THE INVENTION

This application makes reference to, incorporates herein, and claims all benefits accruing under 35 U.S.C. §119 by virtue of a utility model application earlier filed in Korean Industrial Property Office on Dec. 30, 1994, entitled APPARATUS AND METHOD FOR SETTING A PASSWORD USING A MICROPROCESSOR IN A DISPLAY DEVICE and a patent application filed in the above office on Dec. 18, 1995, entitled APPARATUS AND METHOD FOR SETTING AN ID CODE USING A MICROCOMPUTER IN A DISPLAY DEVICE, which were duly assigned Serial Nos. 94-38285 and 95-51338, respectively by that Office.

FIELD OF THE INVENTION

The present invention relates generally to an apparatus and method for setting an ID code using a microcomputer in a display device, and more particularly, to an apparatus for setting an ID code in a display device using a microcomputer which receives an input signal indicative of an ID code input with a preset code stored in a memory device to determine conformity, and thereby controlling a display device and method therefor. As a part of an effort to meet with the needs of consumers, display devices such as a cathode ray tube used in television receivers and computer monitors are generally provided with a microcomputer or a signal processing device equivalent thereto.

A microcomputer incorporated in a display device enhances the performance of the device, while efficiently providing an economy. Most display devices incorporating a micro-processor usually are not provided with a function capable of setting up a password for operating a device. Accordingly, every one who becomes aware of manipulation may access a display device regardless of the control of an authorized user. When children are forbidden use of a television receiver or VCR (e.g., to never watch particular channels on TV, otherwise on occasion a display device being desired to operate with a particular computer) then such a display device without the function described above may cause a problem. For instance, an unauthorized user would access the display device for private use and children may watch TV without parent's control, and even worse confidential information may be stolen.

SUMMARY OF THE INVENTION

Therefore, it is a general object of the present invention to provide an apparatus and method for setting up a password using a microcomputer in a display device.

It is a more particular object of the present invention to provide an apparatus and method for setting an ID code using a microcomputer in a display device wherein use of an ID code (e.g., a password) is determined each time the display device is turned on, and when used, an ID code signal is input via an input device, then being compared with a preset code stored in a memory device thereby controlling the device responsive to the comparison.

An apparatus constructed according to the principles of the present invention incorporates a video amplifier means for amplifying image information input from a computer to display on a screen of a cathode ray tube, a key pad including an array of keys for providing a key input signal by a user's key stroke, a memory device for storing and maintaining stored ID code data input from the key pad by a user's manipulation, a microcomputer for comparing the ID code input from the key pad with a preset code stored in the memory device to control a display device responsive to the comparison, and for controlling the operation of the display device by using horizontal and vertical synchronizing signals input from the computer, an on-screen display (OSD) circuit for converting digital signals synchronized with a clock signal input from the microcomputer into an analog video signal comprised of red R, green G, and blue B components, and a mixer for mixing the video signal of R, G, B components input from the OSD circuit and an input signal of R, G, B components generated from the video amplifier means.

A method for setting up an ID code according to the principles of the present invention for use in a display device incorporating a key pad for inputting an ID code, a memory device for storing ID code data and a microcomputer for comparing the ID code input from the key pad with a preset code data stored in a memory to control a display device according to a result of the comparison, is contemplated with the steps of providing a confirmation stage wherein a memory is checked to determine whether it is required to confirm that a newly input ID code conforms with a preset ID code data each time the display device is turned ON, and providing a readout stage for reading preset ID code data out from the memory when it is stored, and providing a detect stage wherein an ID code is input from a key pad by a key stroke of a user's manipulation, and providing a determine stage for determining consistency between the ID code input from the key pad and a preset code data stored in the memory device based on a comparison, and providing a main routine stage for processing a main routine of a normal operation of the display device when the ID code input from the key pad is in conformity with the preset code data, and providing a subroutine stage for processing an error routine when inconsistent.

BRIEF DESCRIPTION OF DRAWINGS

Features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DETAILED DESCRIPTION OF PREFERRED EMBODIMENTS

Figure 1:
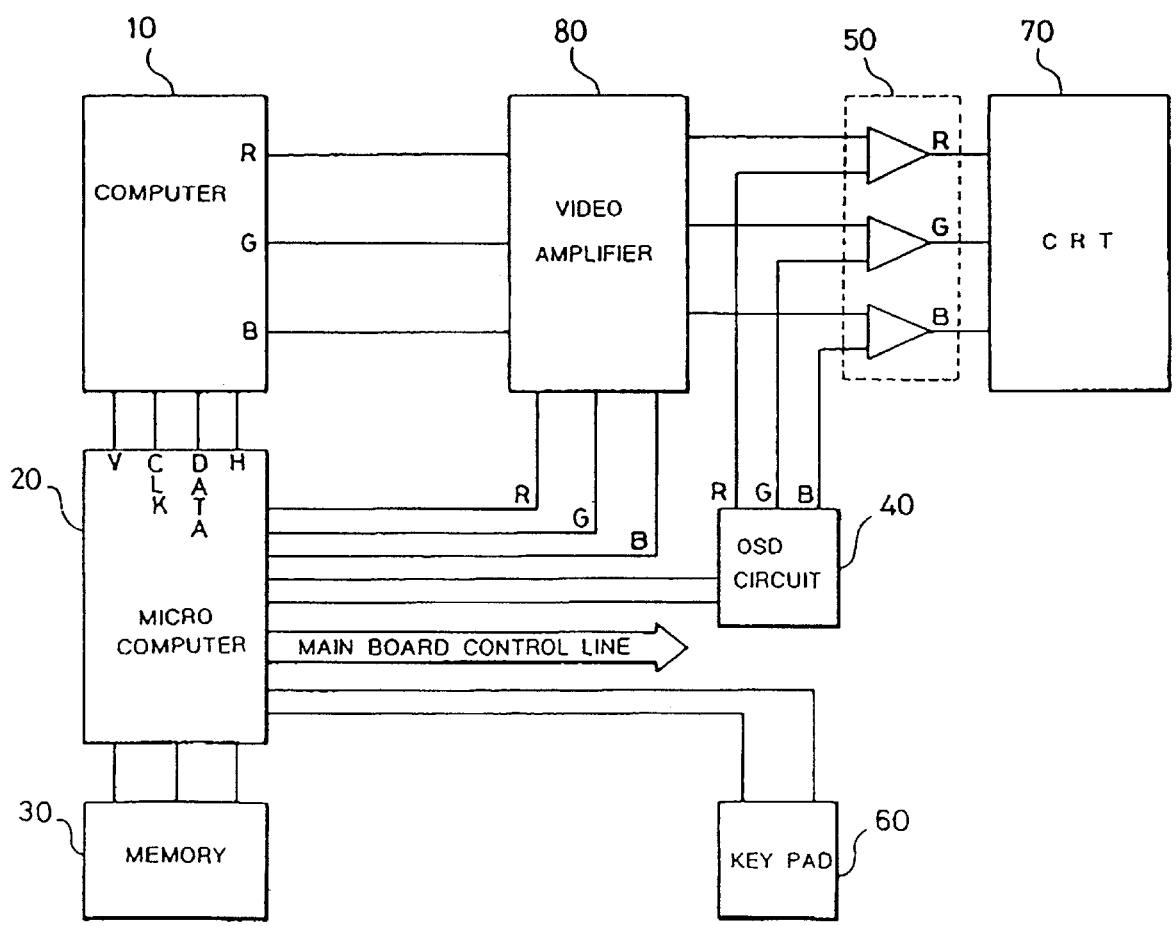
FIG. 1 is a preferred embodiment of an apparatus for setting an ID code using a microcomputer in a display device according to the principles of the present invention.

Turning now to the drawings, a representation of an exemplary design for an apparatus for setting up an ID code using a microcomputer for use with a display device is illustrated in block diagram form in FIG. 1. As shown in FIG. 1, in a display system, an apparatus for setting up an ID code using a microcomputer constructed in accordance with the present invention includes a video amplifier 80 for amplifying image information signals input from a computer system 10 to display an image on a screen of a cathode ray tube display 70, a key pad 60 for generating a key input signal responsive to a user's key stroke, a memory device 30 for storing and maintaining ID code data input from the key pad 60, a microcomputer 20 for controlling an operation of a display device responsive to a result of a comparison between the ID code input from a key pad 60 and preset ID code data stored in a memory device 30, and for controlling a cathode ray tube display 70 in response to horizontal and vertical frequency signals input from a computer 10, an on-screen display OSD circuit 40 for a digital information signal synchronized with a train of clock pulses input from a microcomputer 20 into an analog video signal comprising of red R, green G, and blue B components, and a mixer 50 for mixing the analog video signal of R, G, B component from an OSD circuit 40 with an output signal of R, G, B components from video amplifier 80 to output to cathode ray tube 70.

Figure 2:
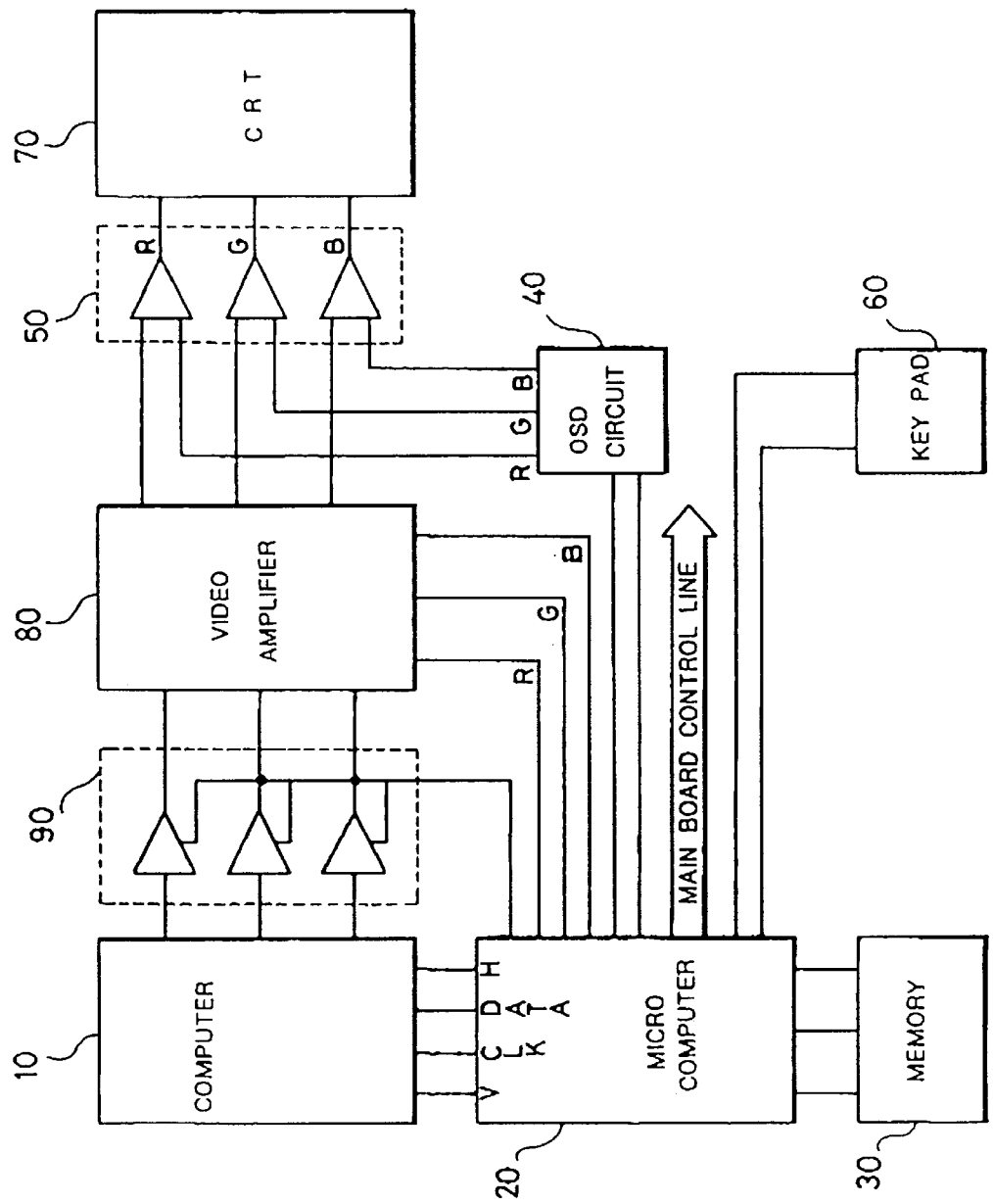
FIG. 2 is another preferred embodiment of an apparatus for setting an ID code using a microcomputer in a display device according to the principles of the present invention.

FIG. 2 sets forth a schematic diagram of another preferred embodiment of an apparatus for setting up an ID code using a microcomputer in a display device constructed in accordance with the present invention, wherein like reference numerals designate like portion in FIG. 1. As shown in FIG. 2 all parts are same as the construction in FIG. 1 except a set of analog switches 90 are interposed in the electrical conduction path between computer 10 and video amplifier 80.

With general reference to FIGS. 1 and 2, the present invention will be explained in greater detail in conjunction with the flow charts shown in FIG. 3 and FIG. 4 to implement the same in sequential order.

Each time the display a system is powered on from a source of power, microcomputer 20 reads a flag indicative of whether password system is enabled (step S1). A flag read from the stack area of a memory 30 is detected to determine whether a password system is enabled (step S2). If disabled, control of the system is passed into a main routine (FIG. 4) in order to perform a normal operation of a display device. If the password system is enabled, microcomputer 20 sets up an arbitrary number 'M' as a count of the number of times an input of an ID code is allowed, while reading preset ID code data from memory 30 (step S3). Then, a message indicative of a request for a user to manipulate a key pad to input an ID code is displayed on a screen of cathode ray tube display 70 (step S4). A count 'N' of key stroke inputs, which is a number of digits reserved for an ID code, is set (step S5). Microcomputer 20 then displays the ID code input via key pad 60 by a user's manipulation on a screen of cathode ray tube display 70 (step S6). A routine is operated so as to decrease the count 'N' of ID code key stroke inputs (step S7). An ID code of 'N' digits is thereby input to microcomputer 20 (step S8). That is, when count 'N' equals to "0", the ID code input is complete. Microcomputer 20 compares, when the ID code input is completed, the ID code input by way of a user's manipulation as illustrated in step S6 through step S8 with a preset ID code data read from memory 30 via step S3 as explained above (step S9). Responsive to a result of the comparison indicative of conformity between both ID codes, a screen of the cathode ray tube display is cleared by an input signal from OSD circuit 40 and control is jumped into a main routine to thereby normally operate the cathode ray tube display (step S10). A message indicative of an unauthorized ID code input by a user is displayed when an inconsistancy occurs between an input ID code and a preset ID code data (step S11). A routine decreasing count 'M' (i.e., a REPEAT count) by one is repeatedly performed (step S12) until it reaches to "0" (step S13). If an inconsistency continues to occur when 'M' has become zero, microcomputer 20 determines that the user who currently manipulates the key strokes is an unauthorized user, displays a warning sign on the screen of cathode ray tube display 70 and then causes a drive signal, having R, G, and B components, output from video amplifier 80 to have a voltage level of substantially zero.

As a result, the output gain of a signal having R, G and B components from computer 10 becomes zero resulting in no influence upon input terminals of cathode ray tube display 70, while OSD circuit 40 is still enabled. As is set forth above, either an authorized ID code signal is initially input (FIG. 5(A)) or an input ID code becomes consistent with preset ID code data during repeated ID code inputs by key strokes of a user's manipulation, or when it is otherwise determined that a password system is disabled in step S2 (e.g., see FIG. 5(B)), then control is passed to a main routine program (step S15). Microcomputer 20 detects overall setting status of a display device so as to initialize the device (step S16). Vertical synchronizing signal V—SYNC and horizontal synchronizing signal H—SYNC input from computer 10 are adjusted so as to perform a normal operation of cathode ray tube 70 (steps S17 and S18).

In addition, a program executed by microcomputer 20 incorporates a plurality of subroutines. On subroutine referenced by J1 is executed when a key stroke by a user initiating an ID code set up procedure generates an input signal, while another subroutine J2 is executed when an ID code setting key which enables or disables a password system is actuated, as generally referenced by alphabet J and shown in FIG. 4.

Figure 3:
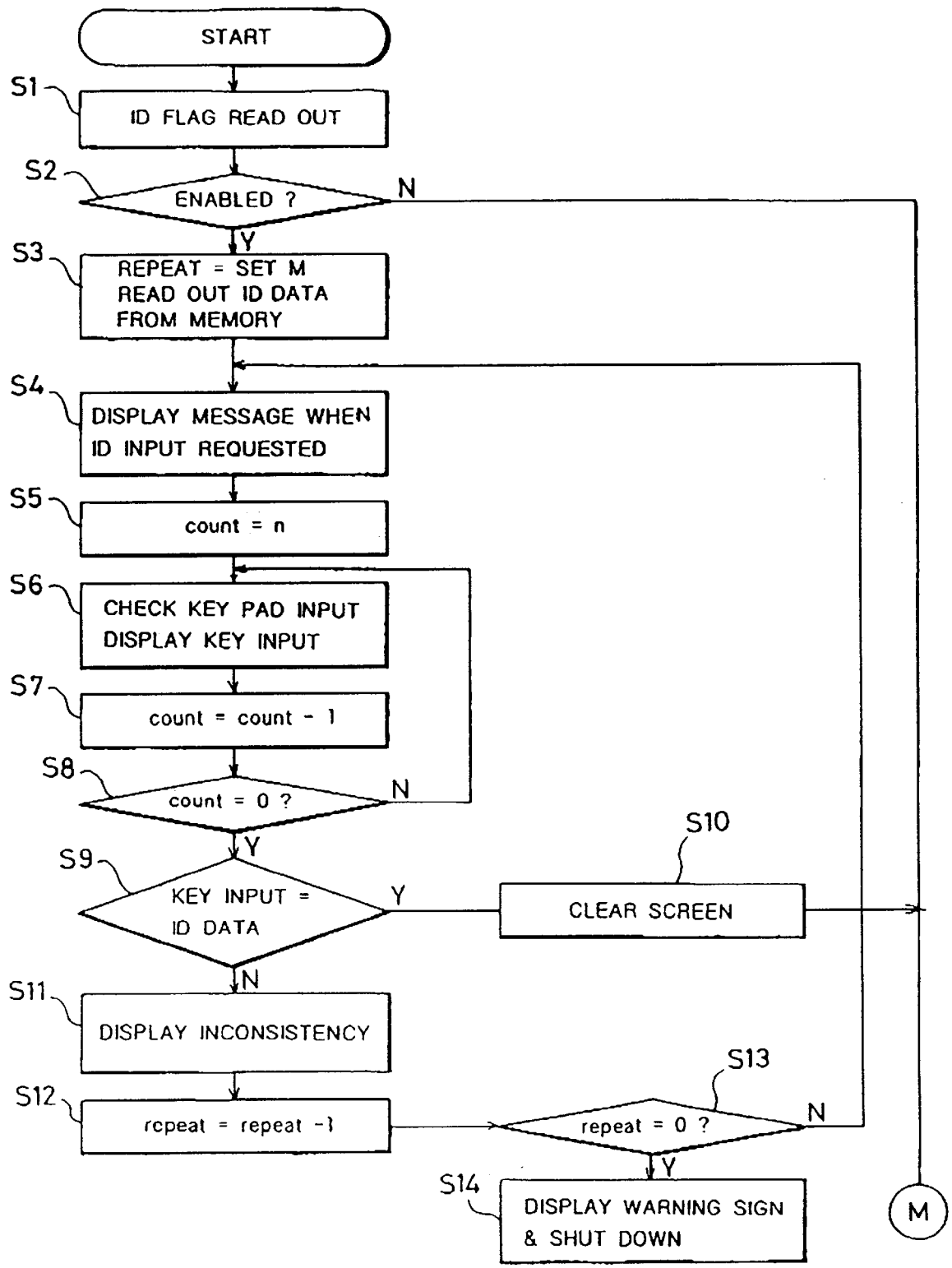
FIG. 3 is a flow chart illustrating a sequence for confirming an ID code signal input according to an implementation of the principles of the present invention.
Figure 4:
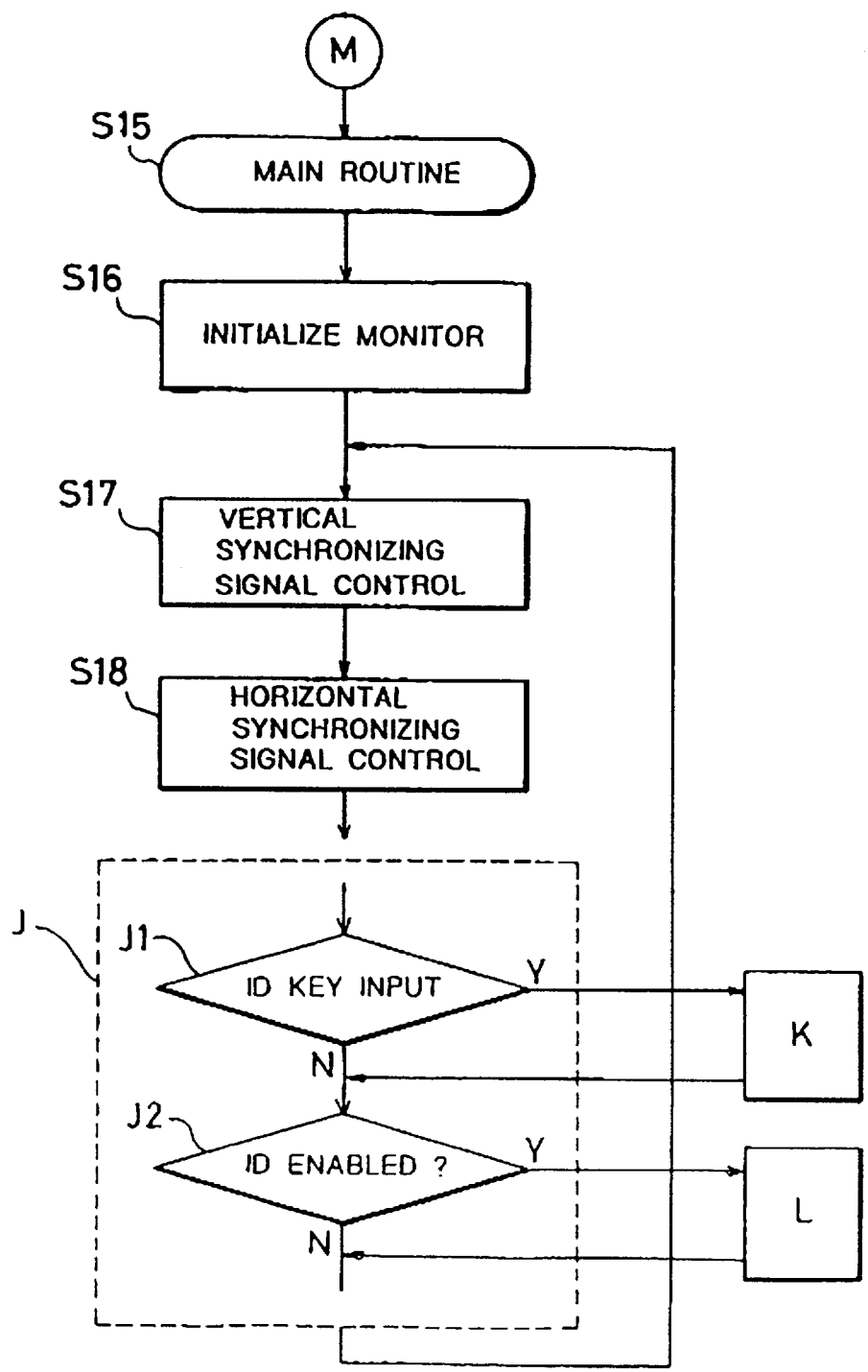
FIG. 4 is a flow chart illustrating a sequence for controlling a display device by a microcomputer according to an implementation of the principles of the present invention.
Figure 5:
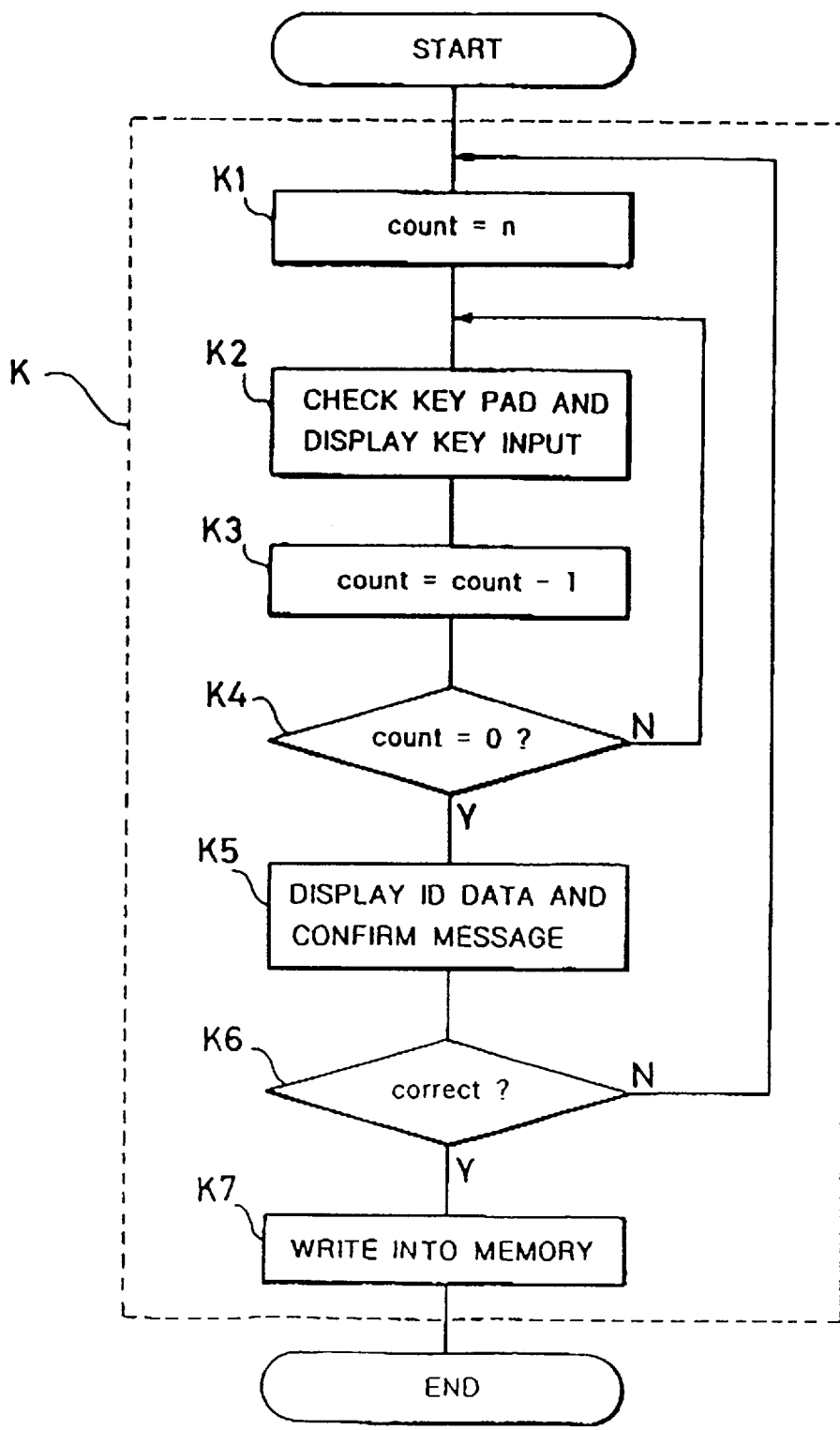
FIG. 5(A) is a flow chart illustrating a sequential order of a subroutine labeled K in FIG. 4.
FIG. 5(B) is a flow chart illustrating a sequential order of a subroutine labeled L in FIG. 4.
Figure 5:
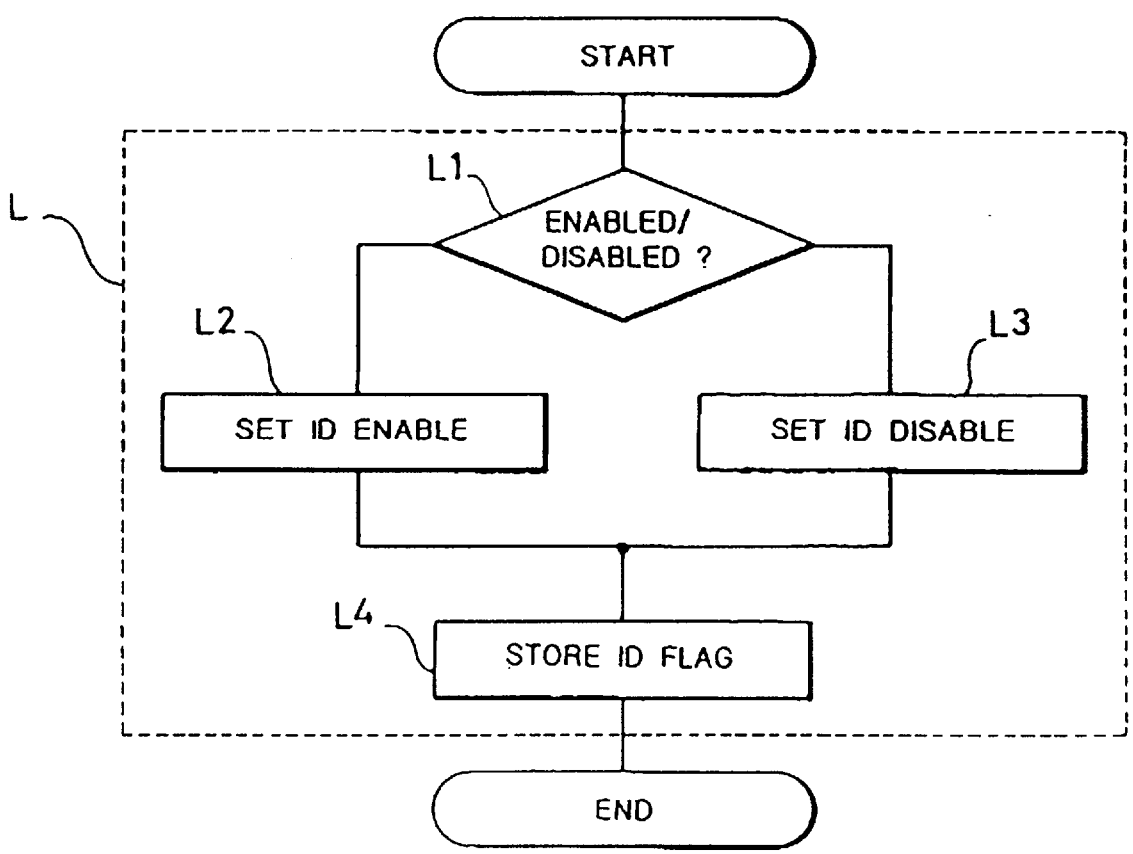

FIG. 5(A) illustrates a flow chart sequentially performing an operation referenced by J1 (FIG. 4), of a subroutine, as labeled 'K', the sequential procedure shown in FIG. 5(A) is similar to that shown in FIG. 3 and therefore, this subroutine is performed when memory 30 has no ID code data input. Thus, memory 30 receives a predetermined value stored at the location reserved for the preset ID code to indicate that no ID code data has been stored in the memory. To explain the subroutine, generally referenced by 'K' in a dashed line, a numeral 'N' arbitrarily selected for defining the number of digits of an ID code, (i.e., a count of key strokes inputs), is set (step K1). Microcomputer 20 displays on a screen an ID code input from key pad 60 by a user's manipulation (step K2), then decreases the count "N" by one (step K3) so that 'N' digits of an ID code are able to be input by key strokes (step K4).

Namely, a routine for receiving a key input (step K1 through step K4) is repeatedly executed until count 'N' becomes zero. When count 'N' becomes '0', then microcomputer 20 determines as many input digits as there are counts set by numeral 'N'. Then both ID code and a message are displayed on a screen of cathode ray tube display 70 to view and thereby to be subjected to a user's confirmation (step K5).

When confirmed, the newly input ID code is written into memory 30 and control is then passed to a main routine (step K7). On the contrary, when an error occurred in step K6, control is passed back to step K1 and is looped again.

In a subroutine generally referenced by alphabet 'J' (FIG. 4) another shunted subroutine labeled by 'L' (FIG. 5(B)) is performed according to a result of 'Y' as show in step 'J' in FIG. 4. A value of a key input is detected when a key stroke is manipulated by a user on a pre-selected key on key pad 60 so as to determine the use of a password system in a display device (step L1). When the key input value represents a signal enabling a password system, then an ID code password is set to enabled (step L2). When the value represents a value other than the signal above, then the use of ID code is set to disabled (step L3). The above values for enabling or disabling the use of an ID code is stored in a segment of memory 30 as being a flag (step L4).

Here, it would be preferrable for a procedure for sequentially setting the above explained password system generally referenced by alphabet 'L' in FIG. 5(B) that an ON/OFF toggle system be used for setting the system. Each time a system is turned on and energized by a power supply source, a flag set forth by way of the above described sequential procedure is automatically detected so as to determine whether a password system is enabled or disabled. To identify properly an authorized ID code input via a key pad, it would also be desirable for a system that a subroutine for determining a state of enable/disable password system be incorporated into a batch file which is automatically executed when the system is powered from a power supply.

To better optimize the performance of a display device, a data signal DATA and clock signal CLK are used to allow bi-directional communication between a computer system and peripheral devices thereof. In addition, any known technique may be employed for the above described communication so as to enable a so-called plug and play function in a computer system. A program for automatically transmitting ID code data to a display device via a communication line connected to the device from a computer system during the time interval of booting, when the system is initially powered on, may be incorporated into a batch file for autoexecution thereby saving the trouble of inputting an ID code at each time of use.

Once an ID code password is adapted in a computer system for the sake of security, a display device connected to the system would enjoy the same effect by virtue of the program described above. The above arrangement will cause the display device to require an additional ID code input when used individually. As described above, an apparatus and method for setting an ID code using a microcomputer in a display device according to a preferred embodiment of the present invention allows itself to be used by only an authorized user, preventing others from misusing the device thereby protecting private confidential information. While particular embodiments of the invention have been shown and described, it will be obvious to those skilled in the art that changes and modifications may be made without departing from the invention in its broader aspects. Therefore, the aim in the appended claims is to cover all such changes and modifications as fall with in the true spirit and scope of the invention.

What is claimed is:

1. For use in a cathode ray tube display connected to a computer system, an apparatus for setting an ID code comprising:

video amplifier means for amplifying image information input from said computer system to display on a screen of said cathode ray tube display;

a key pad having an array of keys for generating a key input signal to compose an ID code;

memory means for storing ID code data input via said key pad by a user's manipulation;

a microcomputer for controlling said display responsive to a result of a comparison between said ID code input via said key pad with said ID code data stored in said memory, and for receiving horizontal and vertical frequency signals from said computer system to control an operation of said display;

an on-screen circuit for converting a digital information signal synchronized with a train of clock pulses input from said microcomputer into an analog video signal having red, green and blue components; and mixer means for mixing said analog video signal input from said on-screen circuit and a signal input from said video amplifier means.

2. The apparatus for setting an ID code as set forth in claim 1, said apparatus further comprising a plurality of analog switches interposed on a respective electrical conduction path between respective output terminals of said computer system and respective input terminals of said video amplifier means, said analog switches being turned off by a control signal output from a video mute terminal of said microcomputer when the result of said comparison indicates that said ID code input from said key pad is inconsistent with said stored ID code data.

3. In cooperation with a computer system that provides analog computer image signals, a display system comprising:

a video amplifier to amplify the analog computer image signals to provide amplified image signals;

one of a first microcomputer circuit and a second microcomputer circuit, the first microcomputer circuit including a microcomputer coupled to the video amplifier to control the gain of the video amplifier, the second microcomputer circuit including the microcomputer coupled to analog switches that are coupled between the computer system and the video amplifier so that the microcomputer controls the connection state of the analog switches;

an on-screen circuit to convert digital information signals from the microcomputer into analog on-screen image signals, the microcomputer being coupled to horizontal and vertical synchronizing signals from the computer system to synchronize the analog on-screen image signals with the analog computer image signals;

a memory coupled to the microcomputer to store a stored ID code;

a key pad coupled to the microcomputer to form a keyed ID code, the microcomputer determining when the stored ID code is unequal to the keyed ID code, the microcomputer setting one of (1) the gain of the video amplifier to be substantially zero and (2) a connection state of the analog switches to be in a disconnected state when the microcomputer determines that the stored ID code is unequal to the keyed ID code; and a mixer to provide CRT drive signals from a mix of the amplified image signals and the analog on-screen image signals.

4. The system of claim 3, wherein the microcomputer includes a first program module to receive and store a flag in the memory to indicate that a pass word system is one of enabled and disabled.

5. The system of claim 4, wherein the microcomputer further includes a second program module to receive the keyed ID code and store the keyed ID code in the memory as the stored ID code when the flag indicates that the pass word system is enabled.

6. The system of claim 5, wherein the microcomputer further includes:
- a third program module to read the flag from the memory each time the display system is turned on to determine whether the pass word system is enabled;
- a fourth program module to read data as an ID code from the memory at a location reserved for the stored ID code when the pass word system is enabled;
- a fifth program module to determine consistency between the keyed ID code and the data read as an ID code from the memory;
- a sixth program module to operate a normal routine of the display system when the keyed ID code and the data read as an ID code from the memory are consistent; and
- an seventh program module to operate an error routine of the display system when the keyed ID code and the data read as an ID code from the memory are inconsistent.

7. The system of claim 4, wherein the microcomputer further includes a second program module to receive the keyed ID code and store the keyed ID code in the memory as the stored ID code when both (1) the flag indicates that the pass word system is enabled and (2) data stored in the memory at a location reserved for the stored ID code has a predetermined value indicating that no ID code has been stored in the memory.

8. The system of claim 4, wherein the microcomputer further includes a second program module to read the flag from the memory each time the display system is turned on to determine whether the pass word system is enabled.

9. The system of claim 8, wherein the microcomputer further includes a third program module to operate a normal routine of the display system when the pass word system is disabled.

10. The system of claim 3, wherein the microcomputer includes a first program module to receive the keyed ID code and store the keyed ID code in the memory as the stored ID code.

11. The system of claim 10, wherein the microcomputer further includes:
- a second program module to read data as an ID code from the memory at a location reserved for the stored ID code when a pass word system is enabled;
- a third program module to determine consistency between the keyed ID code and the data read as an ID code from the memory;
- a fourth program module to operate an error routine of the display system when the keyed ID code and the data read as an ID code from the memory are inconsistent;
- a fifth program module to receive horizontal and vertical synchronizing signals from the computer system; and
- a sixth program module to control the on-screen circuit to generate the analog on screen image signals, the analog on screen image signals being synchronized with the horizontal and vertical synchronizing signals and causing a message to be carried in the CRT drive signals, the message indicating that the keyed ID code is inconsistent with the stored ID code when the error routine is operated.

12. The system of claim 3, wherein the microcomputer includes:
- a first program module to receive horizontal and vertical synchronizing signals from the computer system;
- a second program module to receive digital message signals from the computer system; and
- a third program module to control the on-screen circuit to generate the analog on screen image signals, the analog on-screen image signals being synchronized with the horizontal and vertical synchronizing signals and causing a message to be displayed on the display device, the message being composed in accordance with the digital message signals.

13. In a display system that includes a microcomputer and a memory and a key pad and an on screen circuit and a video amplifier, the display system being associated with a computer system, a method comprising steps of:
- amplifying analog computer image signals from the computer system in the video amplifier to provide amplified image signals;
- converting digital information signals from the microcomputer into analog on-screen image signals in the on screen circuit, the microcomputer being coupled to horizontal and vertical synchronizing signals from the computer system to synchronize the analog on-screen image signals with the analog computer image signals;
- storing a stored ID code in the memory;
- forming a keyed ID code in the microcomputer from key pad inputs;
- determining in the microcomputer when the stored ID code is unequal to the keyed ID code;
- setting one of (1) the gain of the video amplifier to be substantially zero and (2) a connection state of analog switches coupled between the computer system and the video amplifier to be in a disconnected state when the microcomputer determines that the stored ID code is unequal to the keyed ID code; and
- mixing the amplified image signals and the analog on-screen image signals to provide CRT drive signals.

14. The method of claim 13, further including steps of receiving and storing a flag in the memory to indicate that a pass word system is one of enabled and disabled.

15. The method of claim 14, wherein the step of storing a stored ID code includes storing the keyed ID code in the memory as the stored ID code when the flag indicates that the pass word system is enabled.

16. The method of claim 15, further including steps of:
- reading the flag from the memory each time the display system is turned on to determine whether the pass word system is enabled;
- reading data as an ID code from the memory at a location reserved for the stored ID code when the pass word system is enabled;
- determining in the microcomputer consistency between the keyed ID code and the data read as an ID code from the memory;
- operating a normal routine of the display system when the keyed ID code and the data read as an ID code from the memory are consistent; and
- operating an error routine of the display system when the keyed ID code and the data read as an ID code from the memory are inconsistent.

17. The method of claim 14, wherein the steps of storing a stored ID code includes storing the keyed ID code in the memory as the stored ID code when both (1) the flag indicates that the pass word system is enabled and (2) data stored in the memory at a location reserved for the stored ID code has a predetermined value indicating that no ID code has been stored in the memory.

18. The method of claim 14, further including a step of reading the flag from the memory each time the display system is turned on to determine whether the pass word system is enabled.

19. The method of claim 18, further including a step of operating a normal routine of the display system when the pass word system is disabled.

20. The method of claim 13, wherein the step of storing a stored ID code includes storing the keyed ID code in the memory as the stored ID code.

21. The method of claim 20, further including steps of:

reading data as an ID code from the memory at a location reserved for the stored ID code when a pass word system is enabled;

determining in the microcomputer consistency between the keyed ID code and the data read as an ID code from the memory;

operating an error routine of the display system when the keyed ID code and the data read as an ID code from the memory are inconsistent;

receiving horizontal and vertical synchronizing signals from the computer system; and generate the analog on screen image signals in the on screen circuit, the analog on screen image signals being synchronized with the horizontal and vertical synchronizing signals and causing a message to be carried in the CRT drive signals, the message indicating that the keyed ID code is inconsistent with the stored ID code when the error routine is operated.

22. The method of claim 13, further including steps of:

receiving at the microcomputer horizontal and vertical synchronizing signals from the computer system;

receiving at the microcomputer digital message signals from the computer system; and generating the analog on screen image signals in the on screen circuit, the analog on-screen image signals being synchronized with the horizontal and vertical synchronizing signals and causing a message to be displayed on the display device, the message being composed in accordance with the digital message signals.

* * * * *